May 29, 1934.    A. W. COCHRAN ET AL    1,960,697
IMPROVED MATRIX FORMER AND DRIER
Filed Feb. 2, 1931    6 Sheets-Sheet 1

Inventors:
Albert W. Cochran
Henry W. Dewey
F. J. Geisler
Attorney

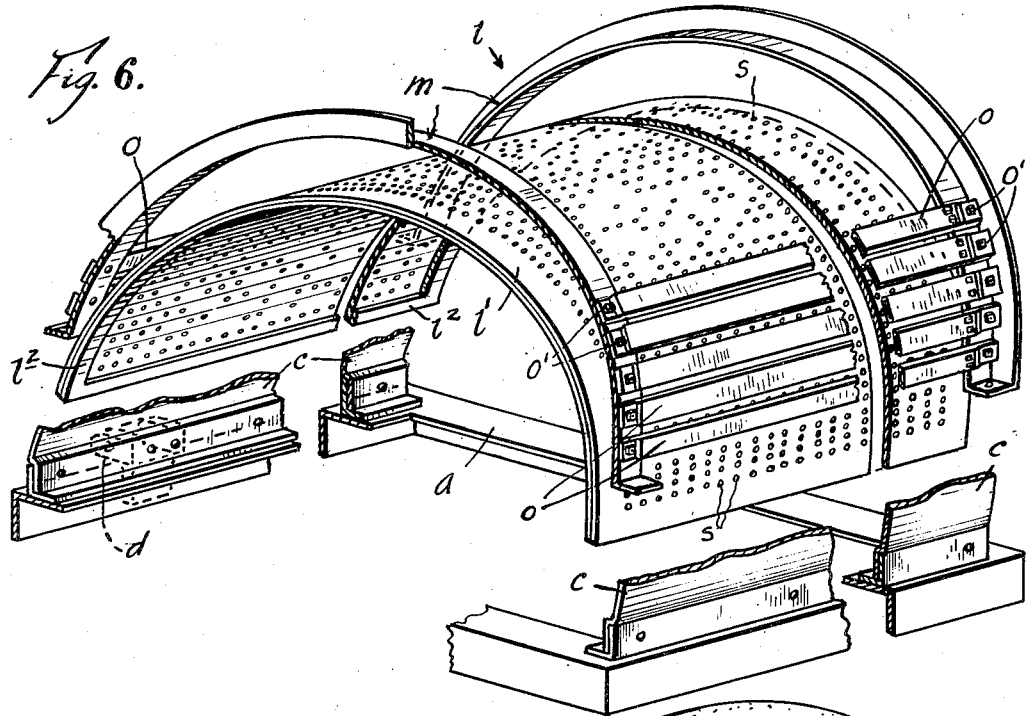
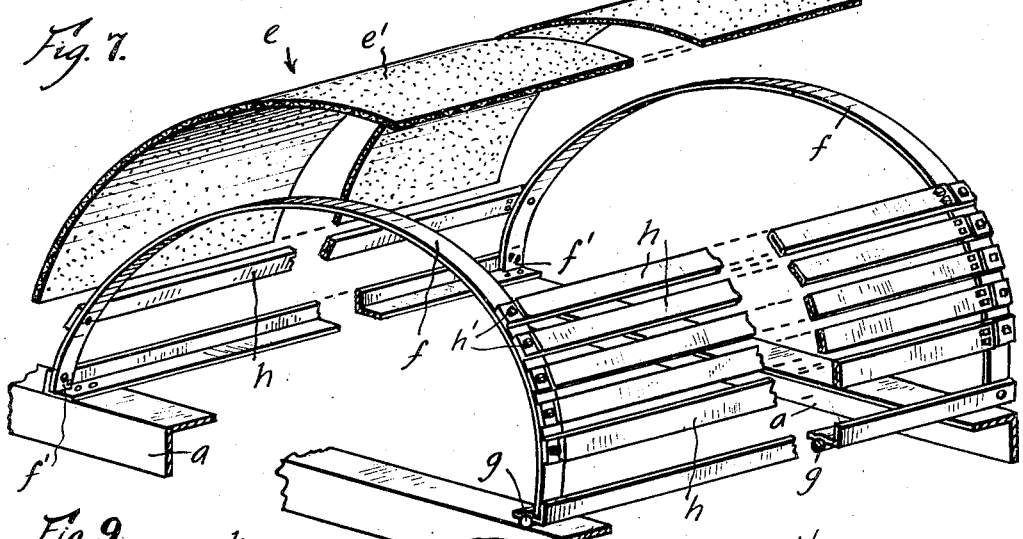
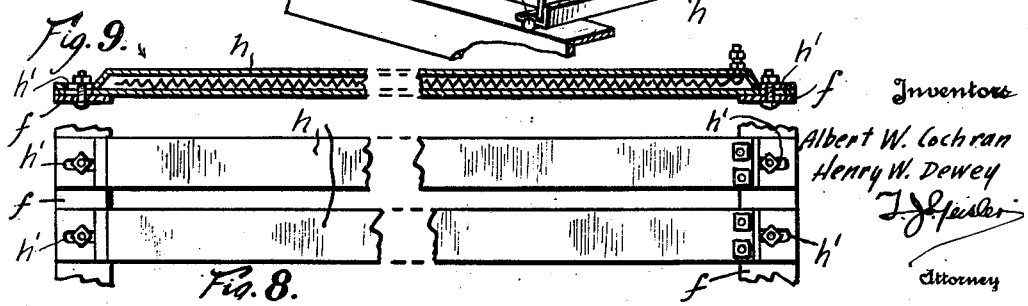

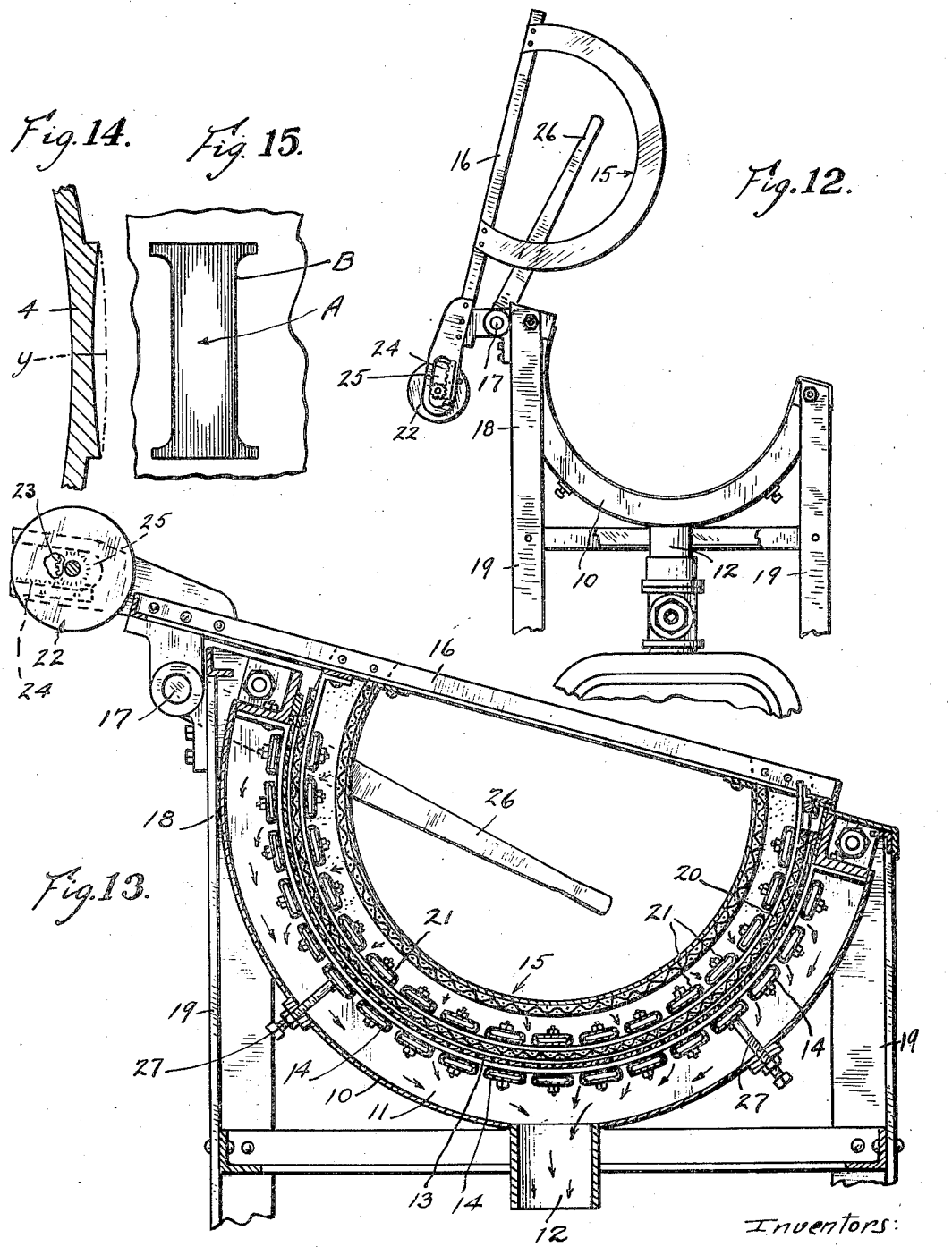

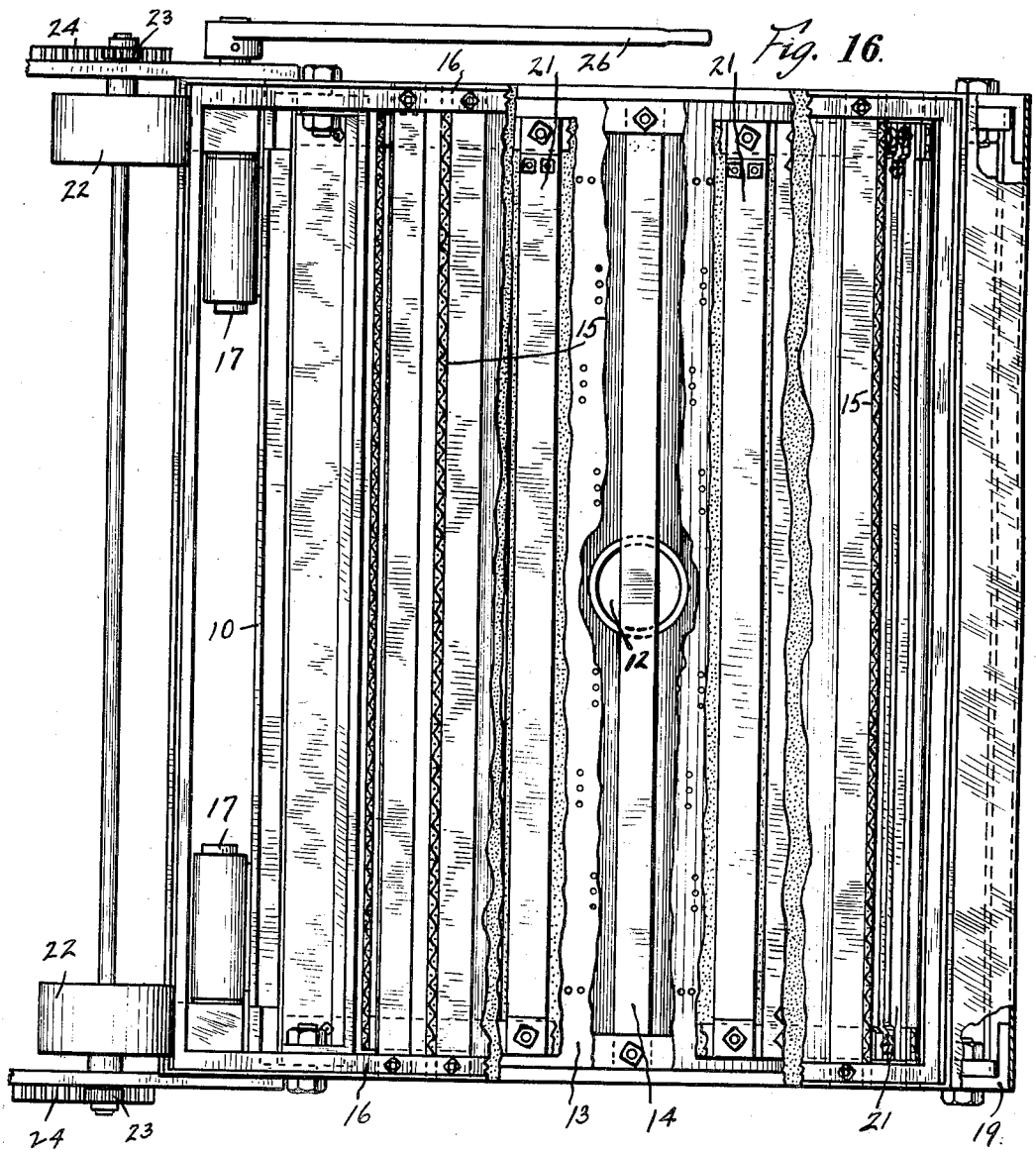
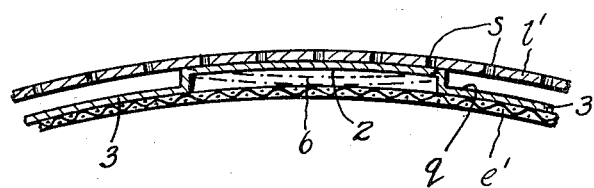

May 29, 1934.   A. W. COCHRAN ET AL   1,960,697
IMPROVED MATRIX FORMER AND DRIER
Filed Feb. 2, 1931   6 Sheets-Sheet 6

Inventor
Albert W. Cochran
Henry W. Dewey

Attorney

Patented May 29, 1934

1,960,697

UNITED STATES PATENT OFFICE 1,960,697

IMPROVED MATRIX FORMER AND DRIER

Albert W. Cochran and Henry W. Dewey, Portland, Oreg.

Application February 2, 1931, Serial No. 512,918

6 Claims. (Cl. 34—16)

Our invention relates to devices for forming and drying stereotype matrices or so called "dry mats" used in the casting of stereotype plates for cylindrical, specifically, newspaper presses; and our present invention is a further improvement upon the invention described in the patent issued to us April 15, 1930, No. 1,754,460, entitled Combined matrix former and drier.

Heretofore, it has been the practice to form and dry a stereotype matrix by placing the same between semi-cylindrical forming elements with its face lying against one of said forming elements which alone was heated, and holding the matrix firmly against the heated forming element by means of an induced vacuum, so as to prevent warping and buckling, utilizing the vacuum also for the purpose of carrying away the vapor given off by the drying matrix.

As a result, the "bottoms" of the type depressions in the face of the matrix not in contact with said heated forming element were relatively cool and the body of the matrix or "spaces" thus tended to dry faster than the bottoms of the type depressions, causing the latter to buckle, as illustrated by Fig. 17 in the drawings accompanying this specification, and in consequence the type faces of the stereotype plate cast from the matrix are slightly concaved.

Such concaved type faces as illustrated in Fig. 14, prevented the middle portion of the type face being brought closely into contact with the paper being printed upon, and the letters so printed therefore tend to have white spots, as shown at A in Fig. 15. This is especially noticeable and difficult to overcome when the printing is done upon so called "hard packing", that is, when a resilient press blanket is not used, as the latter to a certain extent tends to fill up or press the paper into such "concaves" of the type faces.

Therefore, the main object of our invention is to provide a matrix former and drier in which the occurrence of said detrimental results is avoided.

A further object is to provide individual heating means independently controlled for each forming element, in order to prevent the overheating and scorching of the matrix.

A further object of our invention is to provide a matrix former and drier with forming elements, one of which is rigid and the other flexible, whereby the flexible member is adapted to readily conform to the rigid member, thus assuring that any deformity of either forming element frequently caused by repeated heating and cooling, will not tend to impart detrimental deformities to the matrix and the stereotype therein cast.

A still further object of our invention is to provide a matrix former and drier, in which the heating elements are so arranged relatively to the exterior walls of the former and drier as to be spaced from said walls, thus preventing the loss of heat through the latter.

A still further object of our invention is to provide in our matrix former and drier, vacuum inducing means of sufficient strength to hold the cover and base firmly together upon the matrix, independently of mechanical locking or clamping means.

These and other incidental features of our invention, the details of construction and mode of operation are hereinafter fully described with reference to the accompanying drawings.

In the drawings:

Fig. 6 shows an enlarged fragmentary perspective view of the cover housing with parts separated and broken away to illustrate the details of construction;

Fig. 7 shows similarly to Fig. 6 a fragmentary perspective view of the base housing and illustrates the flexible forming element;

Fig. 8 shows two of the heating elements removed from our former and drier;

Fig. 9 shows a longitudinal section of the same;

Fig. 12 shows a diagrammatic view of a modified form of our invention in which the vacuum chamber is provided in the base housing instead of the cover housing and inverted from the positions previously shown;

Fig. 13 shows an enlarged transverse sectional view of the same;

Fig. 14 shows an exaggerated fragmentary section of the concaved type face of a stereotype plate cast from a matrix, which was formed and dried by applying heat to only one side;

Fig. 15 shows a letter printed by the concaved type face shown in Fig. 14, and illustrates in exaggerated detail the white spots resulting therefrom;

Fig. 16 shows an enlarged plan view of the modification illustrated in Figs. 12 and 13 with portions broken away to disclose the underlying parts;

Fig. 17 shows in an exaggerated diagrammatic section how a matrix is properly formed by applying heat to both sides and in broken lines, the improper forming resulting in convex type depressions;

Referring now to Figs. 1 to 11, our matrix former and drier comprises a supporting frame $a$ on which is mounted an oven body comprising a semi-cylindrical base housing $b$ and a complementary cover housing $c$, hinged as at $d$ to the frame $a$.

Figure 1:
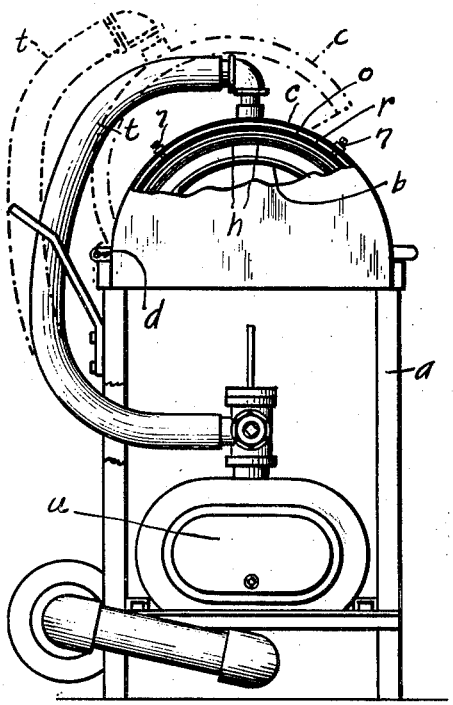
Fig. 1 shows a side elevation of our matrix former and drier.
Figure 2:
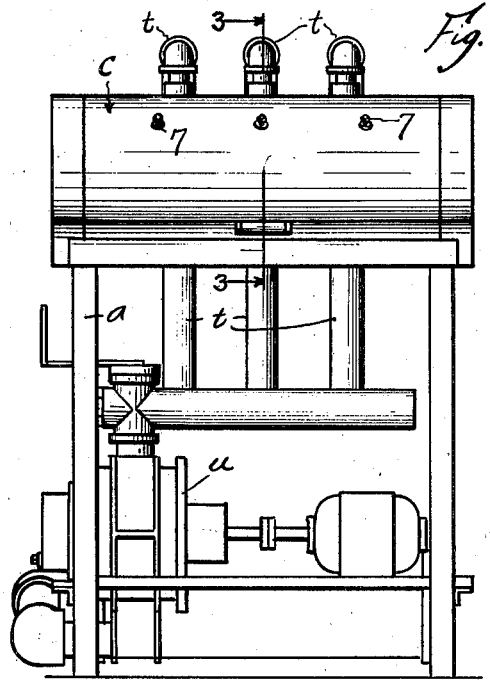
Fig. 2 shows a front elevation of the same.
Figures 3, 4:
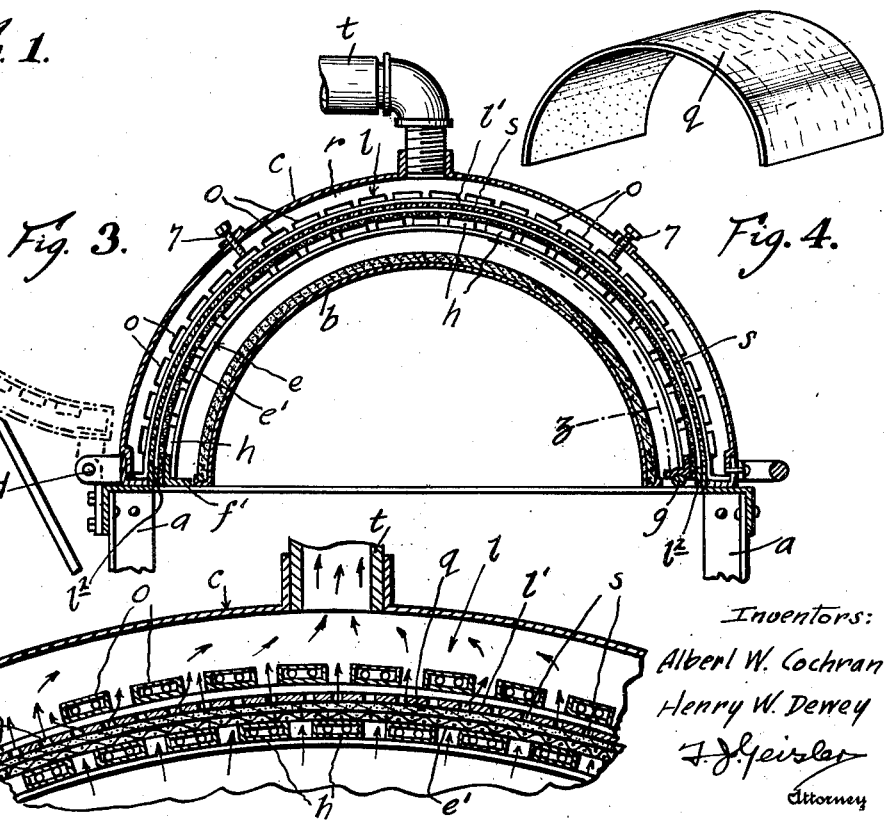
Fig. 3 shows an enlarged section taken on the line 3—3 of Fig. 2 and illustrates the details of the cover and base housings and the relative arrangement of the rigid and flexible forming elements and their independent heating means.
Fig. 4 shows a perspective view of a matrix.
Figure 5:
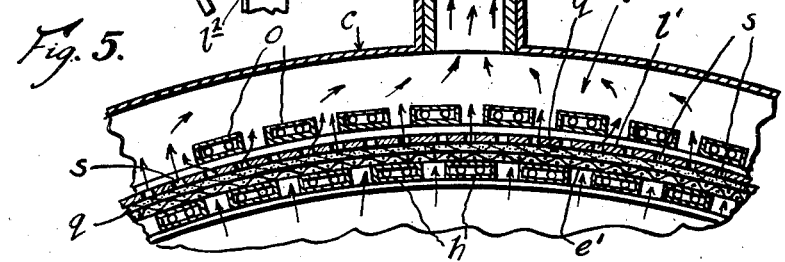
Fig. 5 shows an enlarged fragmentary transverse section taken similarly to Fig. 3 and illustrates the position of the matrix when placed between the forming elements.
Figure 10:
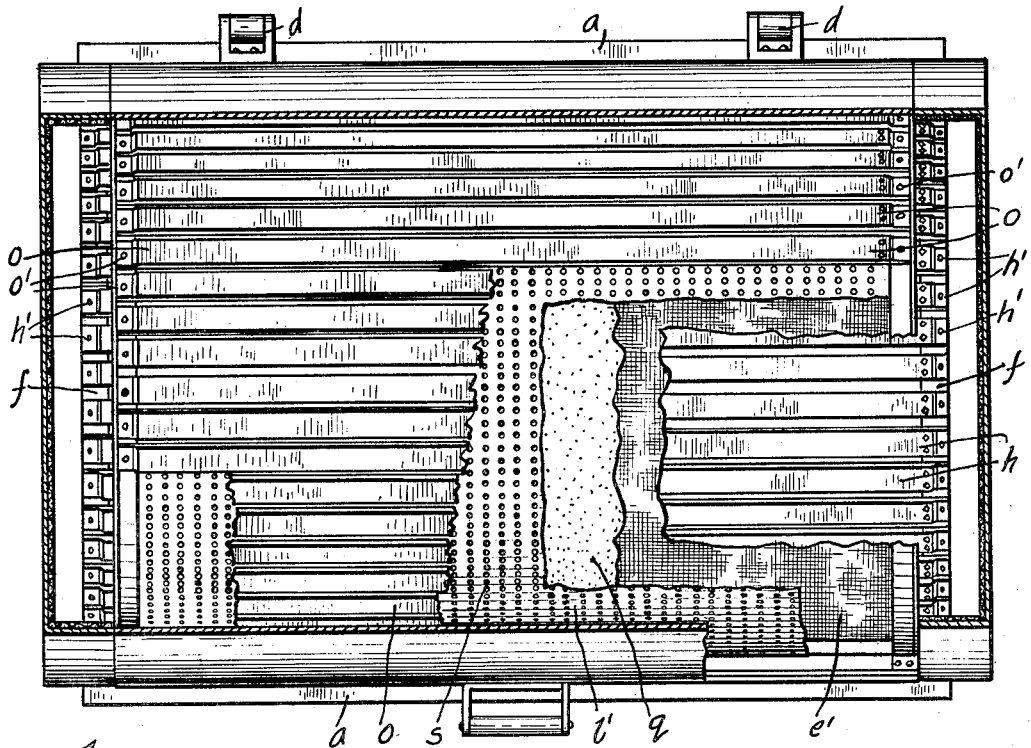
Fig. 10 shows an enlarged plan view of our matrix former and drier with the outer portion of the cover housing and underlying parts broken away to disclose the heating means and forming elements.
Figure 11:
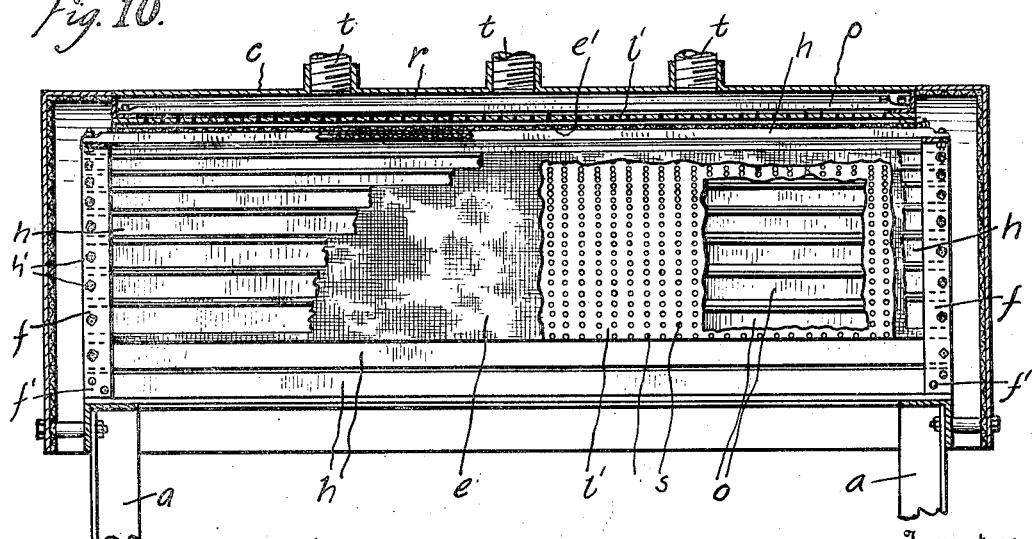
Fig. 11 shows a front elevation similarly to Fig. 10.

The base housing $b$ is provided with a semi-cylindrical, flexible forming element $e$ comprising a relatively stiff, preferably asbestos sheet $e'$, supported on a semi-cylindrical skeleton frame $f$, see Figs. 7 and 10, which is concentrically mounted in the housing $b$ spaced from the walls thereof, see Fig. 3. The end of the frame $f$ adjacent the cover housing hinge $d$ is secured to the frame $a$, as at $f'$, and the other end is freely movable on an anti-friction roller $g$. Transversely arranged electric heating elements $h$ are secured to the frame $f$ between the latter and the said sheet $e'$ so as to be closely in contact therewith, but are permitted slight longitudinal movement in slots $h'$ to compensate for expansion and contraction which might otherwise deform the forming element.

The cover housing $c$ is similarly provided with a forming element $l$ comprising a metal perforated plate $l'$; supported by a skeleton frame $m$, which however is rigidly secured at its ends in the housing $c$, but spaced from the wall thereof. Transversely arranged electric heating elements $o$ are also secured to said frame $m$ as at $o'$ similarly to the forming element $e$.

By this construction, the flexible forming element $e$ is adapted to yield, as shown by the broken line $z$ in Fig. 3, to any deformity of the rigid forming element $l$, which may have been caused by the warping of the latter due to the successive heating and cooling to which our machine is subjected during its continued use.

Further, by providing heating elements $h$, $o$ for each forming element, when the matrix $q$ is placed between them, the bottoms of the type depressions 2, see Fig. 17, are dried quickly simultaneously with "spaces" 3 or body of the matrix and hence do not buckle, but conform with the plate $l$ of the body of the matrix, as illustrated in full lines, at 2, in Fig. 17. And thus are produced true printing surfaces on the stereotype plate cast in our matrix former and drier.

In order to prevent air from being drawn over the edges of the asbestos sheet $e'$ we provide a plate $l'$ with a perimetric or marginal raised surface, or rim, $l^2$ so that by the latter bearing on the margin of the asbestos sheet $e'$, the edges of the latter are sealed; thus compelling the air currents, caused by the suction induced in the cover housing section, to pass thru the pores of the asbestos sheet, and directing the suction forces uniformly against the matrix, with a result that the deep surfaces of the latter are firmly held and quickly dried, and set against the forming plate $l'$.

The broken line 6, in Fig. 17, illustrates in exaggerated detail the result of applying heat to only one side of the matrix, for example, to its face, which causes the bottoms 2 of the type depressions to buckle and since the back of the matrix is held closely against the other forming element, the bottoms of the type depression buckle inward forming convexities, which produce concavities in the type faces of the stereotype plates, as illustrated in exaggerated form in Fig. 14, and thus such concaved type faces will not print black over an entire letter, as B, illustrated at A in Fig. 15.

Further, the cover housing $c$ constitutes a vacuum chamber $r$ and the plate $l'$ is perforated as at $s$. The vacuum chamber $r$ is connected through flexible conduits $t$ with a vacuum pump $u$, carried on the lower portion of the frame $a$.

When the drier is closed, that is to say, the cover brought down on the base, the raised rim $l^2$ of the forming plate $l'$ will seal the margin of the asbestos, matrix-holding sheet $e'$ and thus confine the suction pressure directly to and effectively against the matrix. Incidentally, the suction so produced carries away the vapor given off by the drying of the matrix, and thus facilitates the rapid drying of the latter.

Further, the pump $u$ is of such capacity that a greater vacuum is induced in the chamber $r$ than is required to carry off the vapors from the drying mat and than can be satisfied by the air leaking into the chamber $r$, with the result that the cover housing is held closely on the base by the excess vacuum without auxiliary clamping or locking means.

To prevent the force of the vacuum from drawing the forming element $l$ from its concentric arrangement, and thus deforming it, we have provided studs 7 threaded through the housing walls and bearing against the heating elements of the forming element 1 to hold the latter in position against the force of the vacuum.

Further, to prevent the combined heat of the heating elements $h$, $o$, from overheating and scorching the matrix, we have made them independently controlled, so as to be adapted to be heated to individual predetermined temperatures, the combined effect of which will be to heat the matrix to the desired temperature for the most rapid and efficient drying and forming of the matrix.

In Figs. 12, 13 and 16, we have shown a modification of our invention in which the base housing 10 of the oven body is inverted from the position previously shown and constitutes a vacuum chamber 11 connected with a source of vacuum through a conduit 12. The forming element 13 of the base is rigid and is provided with heating elements 14.

The cover housing 15 is carried on arms 16 fast on a shaft 17 journaled in an extension 18 of the supporting frame 19. The cover housing 15 is provided with a flexible forming element 20 similar to that before described carrying heating elements 21.

The arms 16 project rearwardly and are provided with counter weights 22 carried in elongate slots 25 and comprising rollers having pinions 23 meshing with racks 24, provided in the said slots. An operating lever 26 is connected to the end of the shaft 17 for raising the cover housing from the base, and the counter weight rollers 22 serve to hold the cover housing uplifted, see Fig. 12, by rolling to the outer ends of the slots 25, and when the cover housing is lowered to roll inward, thus decreasing the leverage to a point where it is overbalanced by the weight of the cover housing. Threaded studs 27 are provided in the base housing 10 which bear against the heating elements 14 of the forming element 13 and prevents displacement by the force of the vacuum.

In this modification, the matrix is somewhat more conveniently placed in the base housing.

Figure 19:
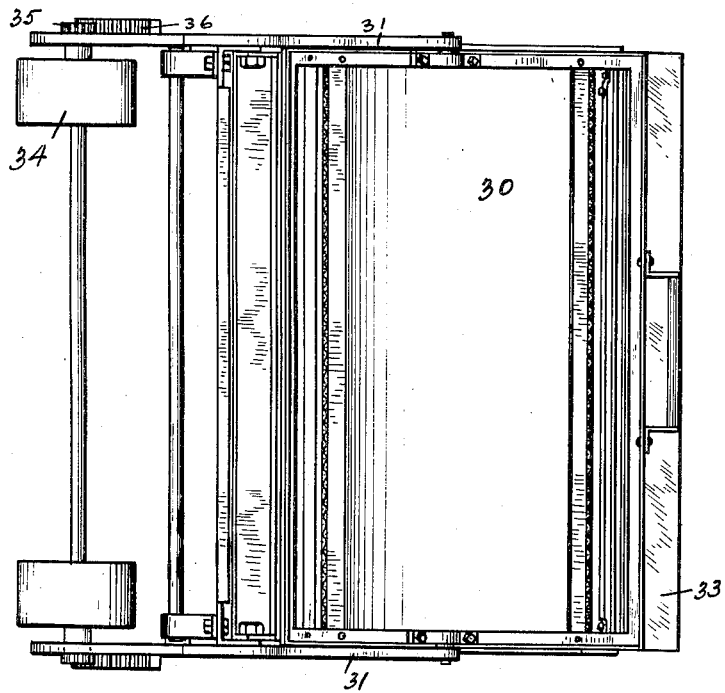
Fig. 19 shows a plan view of the same.
Figure 18:
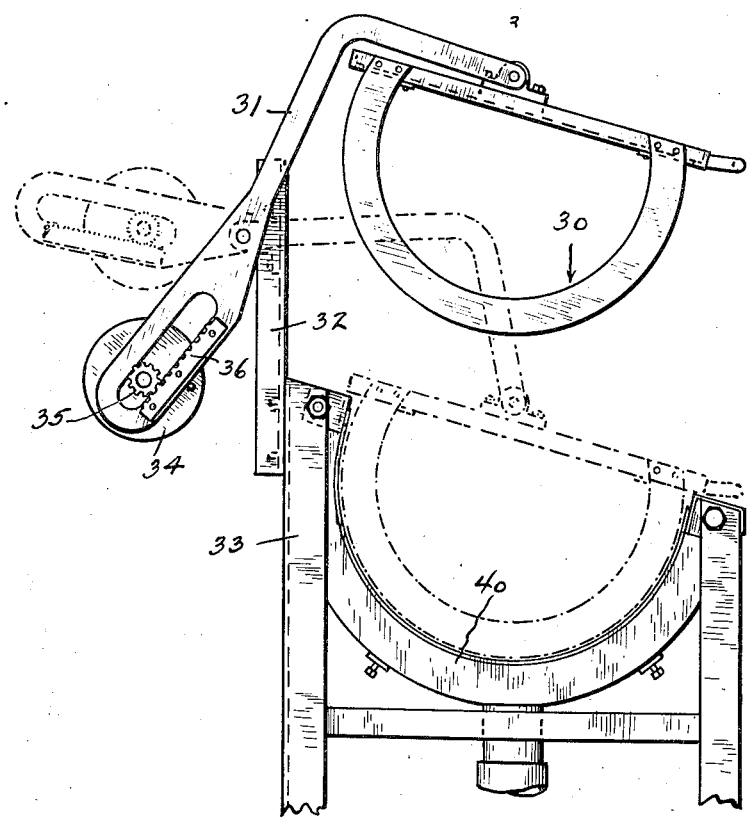
Fig. 18 shows a further modification of our matrix former and drier in which the cover housing is adapted to be raised vertically from the base housing.

Figs. 18 and 19 show a further modification of our invention similar to that just described, except that the cover housing 30 is pivotally secured to angular arms 31 hingedly mounted on an extension 32 of the supporting frame 33. Counter balance rollers 34 are provided on the outer ends of the arms 31 having pinions 35 meshing with racks 36. By this construction, the cover housing 30 may be raised vertically from the base housing 40 and held suspended by the counter balancing rollers 34.

We claim:

1. In a stereotype matrix former and drier, the combination of hollow complementary housing sections, a porous, flexible matrix-holding sheet carried by one of said sections, the other section having a perforated inner wall constituting a matrix forming surface, means providing an offset marginal seal for said porous sheet, thus to provide a matrix receiving space within said marginal seal, means for heating said forming plate and said sheet respectively, and means for applying suction whereby to draw said sheet and the matrix firmly to said forming surface.

2. In a stereotype matrix former and drier, the combination of hollow complementary housing sections, a porous, flexible matrix holding sheet carried by one of said sections, the other section having a perforated inner wall constituting a matrix forming surface, the latter provided with a slightly raised rim adapted to effect the marginal ensealing of said sheet and form therewith, within its margin, a matrix receiving space, means for heating said forming plate and said sheet respectively, and means for applying suction whereby to draw said sheet and the matrix firmly to said forming surface.

3. In a stereotype matrix former and drier, the combination of, hollow complementary curved housing sections, one thereof having a perforated inner wall constituting a forming surface, a yielding supporting means conforming with said forming surface, carried by the other housing section, a flexible porous sheet supported by said supporting means, means providing an offset marginal seal for said porous sheet, thus to provide a matrix receiving space within said marginal seal, electric heating elements carried by said inner wall, and other electric heating elements carried by said sheet-supporting means, the latter heating elements arranged to accommodate relative expansion and contraction, means for applying suction, whereby to draw said sheet and the matrix firmly to said forming surface.

4. In a stereotype matrix former and drier, the combination of hollow complementary curved housing sections, one thereof having a perforated inner wall constituting a forming surface, a flexible frame conforming with said forming surface, carried by the other housing section, a flexible porous sheet supported by said frame, means providing an offset marginal seal for said porous sheet, thus to provide a matrix receiving space within said marginal seal, electric heating elements carried by said inner wall, and other electric heating elements carried by said sheet-supporting frame, the latter heating elements arranged to accommodate relative expansion and contraction, means for applying suction, whereby to draw said sheet and the matrix firmly to said forming surface.

5. In a stereotype matrix former and drier, the combination of, hollow complementary curved housing sections, one thereof having a perforated inner wall constituting a forming surface, a yielding supporting means conforming with said forming surface, carried by the other housing section, a flexible porous sheet supported by said supporting means, said forming surface provided with a slightly raised rim adapted to effect the marginal ensealing of, and to provide a matrix-receiving space within the margin of said sheet, electric heating elements carried by said inner wall, and other electric heating elements carried by said sheet-supporting means, the latter heating elements arranged to accommodate relative expansion and contraction, means for applying suction, whereby to draw said sheet and the matrix firmly to said forming surface.

6. In a stereotype matrix former and drier, the combination of hollow complementary curved housing sections, one thereof having a perforated inner wall constituting a forming surface, a flexible frame conforming with said forming surface, carried by the other housing section, a flexible porous sheet supported by said frame, said forming surface provided with a slightly raised rim adapted to effect the marginal ensealing of, and to provide a matrix-receiving space within the margin of said sheet, electric heating elements carried by said inner wall, and other electric heating elements carried by said sheet supporting frame, the latter heating elements arranged to accommodate relative expansion and contraction, means for applying suction, whereby to draw said sheet and the matrix firmly to said forming surface.

ALBERT W. COCHRAN.
HENRY W. DEWEY.